United States Patent Office 2,752,322
Patented June 26, 1956

2,752,322
IMPREGNATING AND INSULATING MATERIALS

Ernst Knust, Leverkusen-Bayerwerk, Germany, assignor to Farbenfabriken Bayer Aktiengesellschaft, Leverkusen, Germany, a corporation of Germany No Drawing. Application March 1, 1952,
Serial No. 274,499

Claims priority, application Germany March 1, 1951

7 Claims. (Cl. 260—33.8)

This invention relates to the manufacture of new compositions of matter suitable for use for impregnating and insulating purposes.

The hitherto known wax-like products consisting of chlorinated naphthalenes which are especially useful for impregnating and insulating electric structural parts, for instance condensers, display various disadvantages. On the one hand, the mixtures of chlorinated naphthalenes show an insufficient stability towards heat so that on prolonged subjection to higher temperatures substantially below their dropping point determined according to the Ubbelohde method, they soften, begin to flow and lose their shape. On the other hand, the mixtures of chlorinated naphthalenes, though consisting of substances of a different, high chlorine content and isomers containing the same amount of chlorine, in the solid state have a fine, closely crystallized structure and in consequence thereof poor mechanical strength properties.

Many attempts have been made to eliminate the disadvantages associated with the hitherto known wax-like mixtures of chlorinated naphthalenes by incorporating therewith certain high-molecular weight substances or resins, for instances polyvinyl carbazole, polyisobutylene, polyethylene, and colophony. Depending on the character and quantity of the product added, the crystalline structure or the stability to heat or both properties of the wax-like products are affected.

In accordance with the present invention I have found that the mechanical properties of the above impregnating and insulating materials are substantially improved by mixing the chlorinated naphthalenes, preferably in the molten state, with resins prepared from condensable, halogen-containing, aromatic hydrocarbons; the resins suitable for that purpose may be formed in the melt of the chlorinated naphthalenes, optionally in the presence of cross-linking agents. Suitable starting materials for preparing such condensation resins are the halogen-containing organic compounds which split off hydrogen halide in the heat and under the influence of catalysts, autocondensation resulting in resinous products occurring thereby. Typical examples of such halogen-containing, organic compounds are aromatic chloromethyl compounds, such as benzyl chloride, α- and β-chloromethyl naphthalene, chloromethyl diphenyl, chloromethyl anthracene, and chloromethyl phenanthrene; furthermore, chlorinated aromatic hydrocarbons, such as chlorinated naphthalene, anthracene, and phenanthrene, as well as mixtures of the aforesaid substances. Said starting materials may be substituted at the nucleus, for instance by alkyl groups or halogen. Resins of the defined type include for instance those described in German Letters Patents Nos. 327,704, 332,725, 420,443, 332,391, 474,683, 417,667.

Suitable catalysts in the condensation reaction are metallic powder, metallic chlorides or heterogeneous catalysts, such for example as fuller's earth.

The mechanical properties of the new mixtures essentially depend on the character and quantity of the synthetic resin added according to the invention. Thus for instance the condensation of chloromethyl naphthalene in a melt of chlorinated naphthalene of a chlorine content of 59 per cent results in a hard, finely crystalline substance, the dropping point of which is hardly altered as compared with the chlorinated naphthalene as such, whereas for instance a resin of tetrahydro-naphthalene-tetrachloride containing chloromethyl naphthalene gives rise to a mixture having a relatively low dropping point which, however, is still plastic at room temperature and shows a good adhesion and a good bonding strength.

In lieu of one resin component it is practicable to employ two or more components in mixture with the chlorinated naphthalene. This modification offers the possibility of varying the properties of the end products within certain limits.

The softening point of the wax resin mixture may be substantially increased by incorporating therewith filling materials such as kaolinite, fuller's earth, or talc.

Another possibility of modifying the properties of the new compositions of matter consists in treating the resin, during or after condensation, with smaller quantities of cross-linking agents, for example bifunctional chloromethyl compounds such as 1,5-bis-(chloromethyl)-naphthalene, or with minor quantities of paraformaldehyde. The reaction of said compounds apparently leads to cross-linking actions between the individual molecules of the resin, thus securing an improvement of the stability to heat and a rise of the dropping point to such an extent that an insoluble resin may be obtained in the wax melt depending upon the quantity of the cross-linking agent added.

The invention is further illustrated by the following examples without being restricted thereto, the parts given being by weight.

Example 1

105 parts of a chlorinated naphthalene of a chlorine content of 59 per cent, which has a dropping point of 130° C. (determined according to the Ubbelohde method) and begins to flow on prolonged subjection to temperatures of 100° C., are heated with 63 parts of benzyl chloride and 1 part of fuller's earth. The condensation starting at 110° C. is completed by heating the mixture to 200° C. The mixture has a dropping point of 115° C. (according to Ubbelohde). 100 parts of the mixture are melted and 25 parts of fuller's earth are added to the homogeneous solution. The mixture keeps its shape on prolonged subjection to a temperature of 110° C.

Example 2

180 parts of the chlorinated naphthalene described in Example 1 are melted with the addition of 1 part of fuller's earth. By adding 25 parts of pure, distilled chloromethyl naphthalene in portions and with stirring into the melt having a temperature of 150° C., condensation reaction immediately starts. The resulting wax-resin mixture has a softening point of 122° C. and a dropping point of 126° C. The mixture keeps its shape on prolonged heating to 110° C.

If the chloromethyl naphthalene added to the melt of chloronaphthalene contains 10 per cent of 1.5-bis-(chloromethyl)-naphthalene a mixture is obtained which is no longer suitable for casting at 200° C. but softens and therefore is especially fit for extruding. A product of the same properties is obtained by subsequently adding the bis-(chloromethyl)-naphthalene to the wax-resin mixture obtained according to the preceding paragraph at temperatures between 150–200° C.

The condensation of 100 parts of chloromethyl naphthalene results in 80 parts of a chlorine-free resin.

Example 3

60 parts of the crude, dried reaction mixture prepared by chloromethylation of naphthalene, paraformaldehyde and hydrogen chloride are added in drops to 240 parts of a molten chlorinated naphthalene (compare Example 1) wherein 1.5 parts of fuller's earth are suspended. The wax-resin mixture formed in the condensation reaction has a dropping point of 150° C. By adding 1.5 parts of paraformaldehyde to the condensation mixture, the resultant mixture has a dropping point of 123° C. The mass is suited for casting condensers which are to be subjected to working temperatures of 100–110° C.

*Example 4*

The dichloro-anthracene-tetrachloride obtained by chlorinating anthracene in a benzene solution is condensed to a high-melting resin in the presence of 1 per cent of fuller's earth. 10 parts of the resin are melted together with 90 parts of chlorinated naphthalene (compare Example 1) at 150° C.

The wax-resin mixture thus obtained has a dropping point of 120° C. and keeps its shape on prolonged heating to 110° C.

*Example 5*

The tetrahydro-naphthalene-tetrachloride prepared by chlorinating naphthalene in a chloroform solution at temperatures between 10 and 20° C. is condensed in xylene to a plastic resin with the addition of 1 per cent of fuller's earth. 10 parts of the resin are melted together with 90 parts of chlorinated naphthalene (compare Example 1) at 150° C. The resulting wax-resin mixture has a bonding strength of 18 kilogram/cm.² and shows a good adhesion at 20° C.

We claim:

1. A process for the manufacture of a composition of matter for impregnating and insulating purposes, which consists essentially of heating a molten mixture of (1) a waxy chlorinated naphthalene and (2) a condensable halogen-containing aromatic hydrocarbon capable of splitting off hydrogen halide when heated in the presence of an autocondensation catalyst for said halogen-containing aromatic hydrocarbon, said heating being conducted in the presence of said autocondensation catalyst.

2. A process for the manufacture of a composition of matter for impregnating and insulating purposes, which consists essentially of heating a molten mixture of (1) a waxy chlorinated naphthalene and (2) a condensable halogen-containing aromatic hydrocarbon capable of splitting off hydrogen halide when heated in the presence of an autocondensation catalyst for said halogen-containing aromatic hydrocarbon, said heating being conducted in the presence of said autocondensation catalyst and in the presence of a cross-linking agent selected from the group consisting of paraformaldehyde and 1,5-bis-(chloromethyl)-naphthalene.

3. A process for manufacture of a composition of matter for impregnating and insulating purposes, which consists essentially of heating a molten mixture of (1) a waxy chlorinated naphthalene and (2) a resin prepared by a process which consists essentially of heating a condensable halogen-containing aromatic hydrocarbon capable of splitting off halogen halide in the presence of an autocondensation catalyst for said halogen-containing aromatic hydrocarbon, said mixture being heated in the presence of a cross-linking agent selected from the group consisting of paraformaldehyde and 1,5-bis-(chloro-methyl)-naphthalene.

4. A composition of matter for impregnating and insulating purposes obtained by heating a molten mixture consisting essentially of (1) a waxy chlorinated naphthalene and (2) a resin prepared substantially exclusively from condensable halogen-containing aromatic hydrocarbons capable of splitting off hydrogen halide by subjecting said halogen-containing aromatic hydrocarbon to heat in the presence of an autocondensation catalyst.

5. A composition of matter according to claim 4, wherein the condensable halogen-containing aromatic hydrocarbon is a member of the group consisting of benzylchloride, α, and β-chloromethyl naphthalene, chloromethyl diphenyl, chloromethyl anthracene, chloromethyl phenanthrene, dichloroanthracene-tetrachloride and tetrahydronaphthalene-tetrachloride.

6. A composition of matter according to claim 5, wherein the heating of the molten mixture is carried out in the presence of a cross-linking agent of the group consisting of paraformaldehyde and 1,5-bis-(chloromethyl)-naphthalene.

7. A composition of matter according to claim 6, wherein the cross-linking agent is paraformaldehyde.

References Cited in the file of this patent

UNITED STATES PATENTS

| | | |
|---|---|---|
| 2,147,546 | Reiff | Feb. 14, 1939 |
| 2,160,708 | Peacock | May 30, 1939 |
| 2,322,670 | Sparks et al. | June 22, 1943 |
| 2,341,062 | Stager | Feb. 8, 1944 |
| 2,486,756 | Murphy et al. | Nov. 1, 1949 |